(12) United States Patent
Pabla et al.

(10) Patent No.: US 7,908,325 B1
(45) Date of Patent: Mar. 15, 2011

(54) SYSTEM AND METHOD FOR EVENT-BASED COLLABORATION

(75) Inventors: Kuldipsingh A. Pabla, San Jose, CA (US); Eric Pouyoul, San Francisco, CA (US); Calvin J. Cheng, Cupertino, CA (US)

(73) Assignee: Oracle America, Inc., Redwood City, CA (US)

( * ) Notice: Subject to any disclaimer, the term of this patent is extended or adjusted under 35 U.S.C. 154(b) by 1273 days.

(21) Appl. No.: 11/156,983

(22) Filed: Jun. 20, 2005

(51) Int. Cl.
*G06F 15/16* (2006.01)

(52) U.S. Cl. ........ 709/205; 709/223; 709/224; 715/751; 715/753

(58) Field of Classification Search .................. 709/205, 709/223, 224; 715/751, 753
See application file for complete search history.

(56) References Cited

U.S. PATENT DOCUMENTS

| | | | |
|---|---|---|---|
| 5,717,879 A | 2/1998 | Moran | |
| 5,724,508 A | 3/1998 | Harple | |
| 5,752,254 A | 5/1998 | Sakairi | |
| 5,870,547 A * | 2/1999 | Pommier et al. | 709/204 |
| 5,889,946 A | 3/1999 | FitzPatrick | |
| 5,944,785 A | 8/1999 | Pommier | |
| 5,948,022 A | 9/1999 | Carleton | |
| 5,964,834 A | 10/1999 | Crutcher | |
| 5,995,096 A | 11/1999 | Kitahara | |
| 6,199,116 B1 | 3/2001 | May | |
| 6,256,659 B1 * | 7/2001 | McLain et al. | 718/100 |
| 6,304,283 B1 | 10/2001 | Kitagawa | |
| 6,505,233 B1 | 1/2003 | Hanson | |
| 6,633,905 B1 * | 10/2003 | Anderson et al. | 709/219 |
| 6,686,933 B1 * | 2/2004 | Tang et al. | 715/751 |
| 6,704,024 B2 * | 3/2004 | Robotham et al. | 345/581 |
| 6,850,967 B1 | 2/2005 | Spencer | |
| 6,938,069 B1 | 8/2005 | Narayanaswamy | |
| 6,981,019 B1 | 12/2005 | Boies | |
| 7,043,529 B1 | 5/2006 | Simonoff | |
| 7,051,071 B2 | 5/2006 | Stewart | |
| 7,206,811 B2 * | 4/2007 | Skurikhin et al. | 709/205 |
| 7,222,305 B2 * | 5/2007 | Teplov et al. | 715/751 |
| 7,237,006 B1 * | 6/2007 | Prell | 709/205 |
| 7,516,179 B2 * | 4/2009 | Huck et al. | 709/204 |
| 7,624,421 B2 * | 11/2009 | Ozzie et al. | 726/1 |
| 2001/0047393 A1 * | 11/2001 | Arner et al. | 709/216 |

(Continued)

OTHER PUBLICATIONS

"Collaborative Computing", Raatz, *The CPA Journal Online*, Nov. 1993; www.nysscpa.or/cpajournal/old/14628716.html.

*Primary Examiner* — Thu Ha T Nguyen
(74) *Attorney, Agent, or Firm* — Robert C. Kowert; Meyertons, Hood, Kivlin, Kowert & Goetzel, P.C.

(57) ABSTRACT

A first collaboration framework on a first computer system may intercept, via an operating system event handling mechanism on the first computer system, local input events for a first application executing on the first computer system. The first collaboration framework may also send messages including the intercepted input events to other collaboration frameworks executing on other respective computer systems. In response to receiving a message including an intercepted input event, each of the other collaboration frameworks may deliver the input event, via an operating system event handling mechanism to another application. A collaboration framework may deliver an input event intercepted on another computer system to a local application as if the input event were input locally. Delivered input events may cause applications on other computer systems to perform the same one or more actions as performed by the application for which the input event was originally intended.

32 Claims, 8 Drawing Sheets

U.S. PATENT DOCUMENTS

| | | |
|---|---|---|
| 2003/0110117 A1 | 6/2003 | Saidenberg |
| 2004/0003119 A1* | 1/2004 | Munir et al. ................. 709/246 |
| 2004/0015548 A1 | 1/2004 | Lee |
| 2004/0145608 A1 | 7/2004 | Fay |
| 2004/0158610 A1 | 8/2004 | Davis |
| 2005/0273714 A1* | 12/2005 | Beartusk et al. ............. 715/700 |
| 2006/0080432 A1* | 4/2006 | Spataro et al. ............... 709/224 |
| 2008/0046510 A1* | 2/2008 | Beauchamp et al. ......... 709/204 |
| 2009/0077474 A1* | 3/2009 | Mohan et al. ................ 715/753 |
| 2010/0192072 A1* | 7/2010 | Spataro et al. ............... 715/753 |

* cited by examiner

SYSTEM AND METHOD FOR EVENT-BASED COLLABORATION

BACKGROUND OF THE INVENTION

1. Field of the Invention

This invention relates to computer-supported collaboration and more specifically to event-based collaboration.

2. Description of the Related Art

Collaborative software, also known as groupware, is generally a custom application that integrates work on a single project by several concurrent users on separate computer systems. The various participants may be in different rooms, or different cities. Traditionally, the most common way of collaborating on computer desktops is by sending all the pixels and all the Windows/XWindows events to all participants. For example, VNC, NetMeeting, WebEx all grab control over participant's desktops and send information to be displayed on their desktops. This is a form of white board sharing where graphic information in the form of pixels are transferred from one computer to another for display as graphic images. These traditional approaches require significant network traffic and may involve network latency issues which may result in poor user experience due to dropped or missed frames of information.

Another traditional collaboration approach involves sending documents for use with custom collaboration applications during a collaborative session to each participant. Documents may be sent in advance of a session or on demand. Thus, the participants already have any documents to be discussed. During a collaborative session, a collaboration aware application sends commands and/or instructions to another copy of the application executing on a participant's desktop. On receiving the instructions, the application acts accordingly and syncs up with the copy of the application executing on the presenter's desktop. However, such an approach only works with custom applications that are specifically collaboration aware.

SUMMARY

Event-based collaboration, in various embodiments, may be implemented utilizing collaboration frameworks executing on participant's computer systems. For instance, a collaboration framework on a presenter's computer may be configured to intercept input, or other, events on the presenter's computer system and transmit those intercepted events to the collaboration frameworks executing on participants' systems. The events are then delivered to applications on the participants' systems as virtual events. Thus, participants may collaborate using applications that are unaware of the collaboration session and that may not include any collaborative functionality. Thus, the presenter may work with an application on his computer system and, through the intercepted events, control instances of the same application on participants' computer systems. Applications receive the events as if the input event were input locally. Applications on different participant's computers may perform the same actions in response to receiving the same intercepted events. Thus, all participants may have the same look and feel as a presenter. A presenter may be able to control participants' desktops through event-based collaboration and may also hand off control or presenter status to another participant.

For example, in one embodiment, a presenter may be presenting to an (online) audience using Sun Microsystem's StarOffice. Just before the presentation is scheduled to begin, the presenter may specify an application for use in the collaboration session and may also select a document to work with in the application. For instance, the presenter may choose to use a slide show presentation application and select a prepared slide show document. The collaboration framework on the presenter's computer may communicate with collaboration frameworks on the participants' computers informing them of the application and document needed for the collaboration session. The presenter's collaboration framework may also transmit the document for the presentation to other participants' collaboration frameworks. The document may be received by collaboration frameworks executing on participants' computers and automatically opened in an appropriate application on those computers. For instance, a collaboration framework may launch an appropriate application and may instruct the application, by delivering virtual events, to load the document and possibly to change the current view of the document to match the view of the document open on the presenter's computer. When the presenter changes his view of the document, the input event changing the view (such as pressing the page down key or selecting a next page button in the application) may be intercepted by the collaboration framework on the presenter's computer and transmitted to the other collaboration frameworks where the intercepted input event may be delivered to the instance of the application on the respective participant's computer so that the application also changes the view of the open document.

In another example, the presenter may be using a slide show application to display various images while presenting audio information via voice over IP or VoIP technology. The slide show document may have been transferred to each participant as described above, or alternatively, may be accessible from a shared storage location, such as on a shared server. When the presenter moves to a next slide in the presentation, the next slide command (whether input via the keyboard, mouse, menu, or other input method) may be intercepted by the presenter's collaboration framework and transmitted to the participants' collaboration frameworks. Each participant's collaboration framework may then deliver the input event to a slide show application instance on the participant's computer so that the participant and presenter are viewing the same slide.

Additionally, in general, event-based collaboration may be used to collaborate via various types of user activities between computer systems. For example, in one embodiment, events to a calendar application creating or modifying a meeting, or other event, may be captured by a collaboration framework, transmitted to other collaboration frameworks and delivered to calendar applications on other computers to create or modify the same meeting. Thus, two or more calendar applications may perform the same actions (e.g. creating the same meeting) through event-based collaboration, as described herein. In another example, one user may launch an instant messenger application to communicate with a particular colleague. The input events (e.g. mouse or keyboard events) that launch the instant messenger application on the first user's system may be captured by the collaboration framework, transmitted to a collaboration framework on the colleague's system, and delivered on that system in order to launch an instant messenger application on the colleague's system.

Additionally, event-based collaboration may allow system administrators to update or modify various settings or attributes of multiple computers by performing the updates or modifications on one computer and having the relevant input events transferred and delivered, via collaboration frameworks, on other computers. Furthermore, two colleagues may collaborate on a single document without a shared version of that document via event-based collaboration, as described herein. For example, the events modifying the document performed in one colleague's editor may be transferred and delivered to the other colleague's editor.

Thus, event-based collaboration, as described herein, may allow collaboration between applications not specifically collaboration aware and not modified to include specific collaboration functionality. Instead, collaboration frameworks compatible with numerous types of applications, including legacy applications, communicate the collaboration information.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
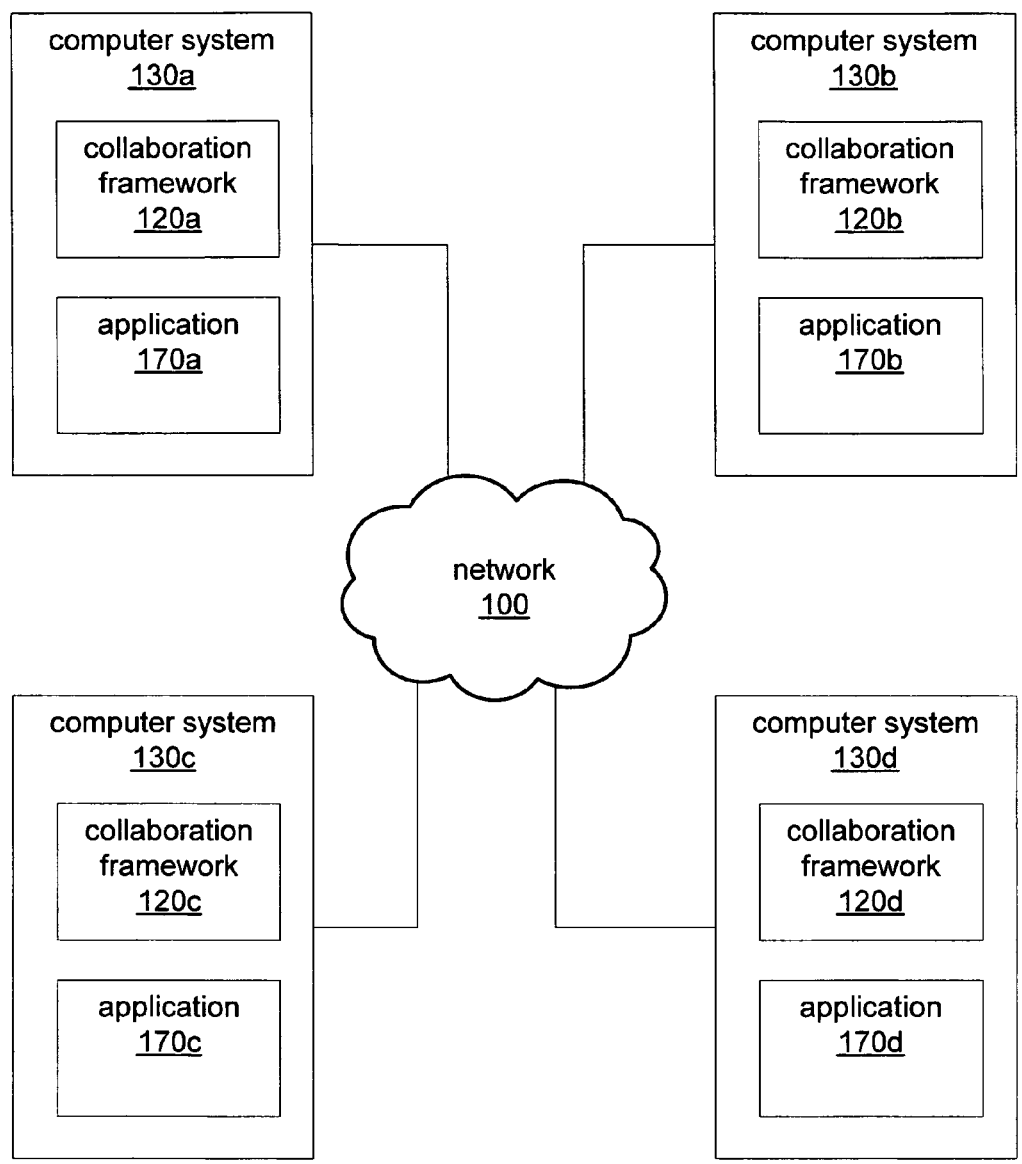
FIG. 1 is a block diagram illustrating a networked computer system for implementing event-based collaboration, according to one embodiment.

Event-based collaboration, as described herein, may provide for collaboration among multiple computers coupled together via networking technology. FIG. 1 illustrates multiple computer systems 130 coupled together via network 100. The network system illustrated by FIG. 1 represents an exemplary embodiment of a system for implementing event-based collaboration, as described herein. Other embodiments may encompass greater or fewer numbers of computers communicating using different network technology than that illustrated on FIG. 1. Event-based collaboration may allow a presenter using one computer system to make a presentation to the other participants using applications executing on each participants', and the presenter's, computer systems. For example, in one embodiment, a presenter may be presenting information using a .PDF document and .PDF viewer application, such as application 170a, executing on the presenter's computer system 130a. The .PDF document may be open in a .PDF viewer program (application 170b-d) on each participant's computer system 130b-d. When the presenter changes to a different the page of the .PDF document, the input event(s) that cause the .PDF viewer program on the presenter's computer system to change the page may be intercepted or captured by a collaboration framework on the presenter's computer system, such as collaboration framework 130a. Collaboration framework 130a on the presenter's computer system may then transmit the captured event(s) to a collaboration framework executing on each participant's computer system. In other words, collaboration framework 120a may capture one or more events for application 170a and transmit those captured event(s) to each of collaboration frameworks 130b, 130c and 130d.

Alternatively, in other embodiments, event-based collaboration may allow collaboration without involving an actual presentation as described above. In some embodiments, two colleagues may collaborate via event-based collaboration without one being a presenter and the other being an audience. For example, two people may collaborate while editing a document without accessing a shared version of that document. The events input on one colleague's system to edit the document may be captured by the collaboration framework, transmitted to a collaboration framework on the other colleague's system and delivered to the editor application on that system to effect the same changes in the document. Additionally, one person may access a calendar application to create or modify a meeting, or other event. In some embodiments, the input events used to create or modify the meeting may be captured by a collaboration framework, transmitted to one or more other collaboration frameworks on other systems, and delivered in calendar applications on those systems to create or modify the same meeting event in those applications on the other systems. Thus, colleagues may, by capturing and delivering input events via event-based collaboration, collaborate in various ways using applications that are themselves unaware that any collaboration is occurring, as described herein.

In some embodiments, event-based collaboration, as described herein, may enable a collaboration session including one presenter and multiple other participants. In other embodiments, collaboration sessions may include more than one presenter. For instance, two people may collaborate using event-based collaboration where input events are intercepted by a collaboration framework on each person's computer system and transmitted to the collaboration framework on the other person's computer system. For example, the two people may be collaborating while authoring a HTML document or web page. Both people may be executing instances of the same HTML editor or other web page editor application and changes made to the HTML document by one person is visible to the other via the intercepted and transmitted input events. Thus, two people may collaborate and view each others input in real, or near real, time through the use of event-based collaboration as described herein.

Alternatively, in other embodiments, two or more people may be co-presenters for a collaboration session. Similarly to the example given above, the collaboration framework on each presenter's computer system may intercept input events and transmit them to a collaboration framework on each other participant's computer system. Additionally, as will be described in more detail below, more than one participant may be a presenter for a collaboration session but with only one presenting at a time. Thus, collaboration frameworks may communicate to hand-off the function of presenting in a collaboration session. Thus, after handing off the presenter's function from one collaboration framework to a second collaboration framework, the second collaboration framework begins intercepting events and transmitting them to each other participant.

A collaboration framework, as described herein, may be a single collaboration application or process configured to intercept input events for other applications and transmit the intercepted input events to other collaboration frameworks executing on other computer systems, according to one embodiment. In other embodiments, however, a collaboration framework may comprise one or more software libraries. Alternatively, in yet other embodiments, a collaboration framework may include one or more operating system extensions installed in an operating system on a participant's computer system. In some embodiments, collaboration framework 120 may be configured to interact with operating system event mechanisms for intercepting and/or delivering events for applications.

Please note that for ease of clarity and discussion, event-based collaboration is described herein mainly in reference to input events. However, any type of events suitable for interception on one computer system, transmission to, and delivery on another computer system may be used with event-based collaboration, according to various embodiments.

Figure 2:
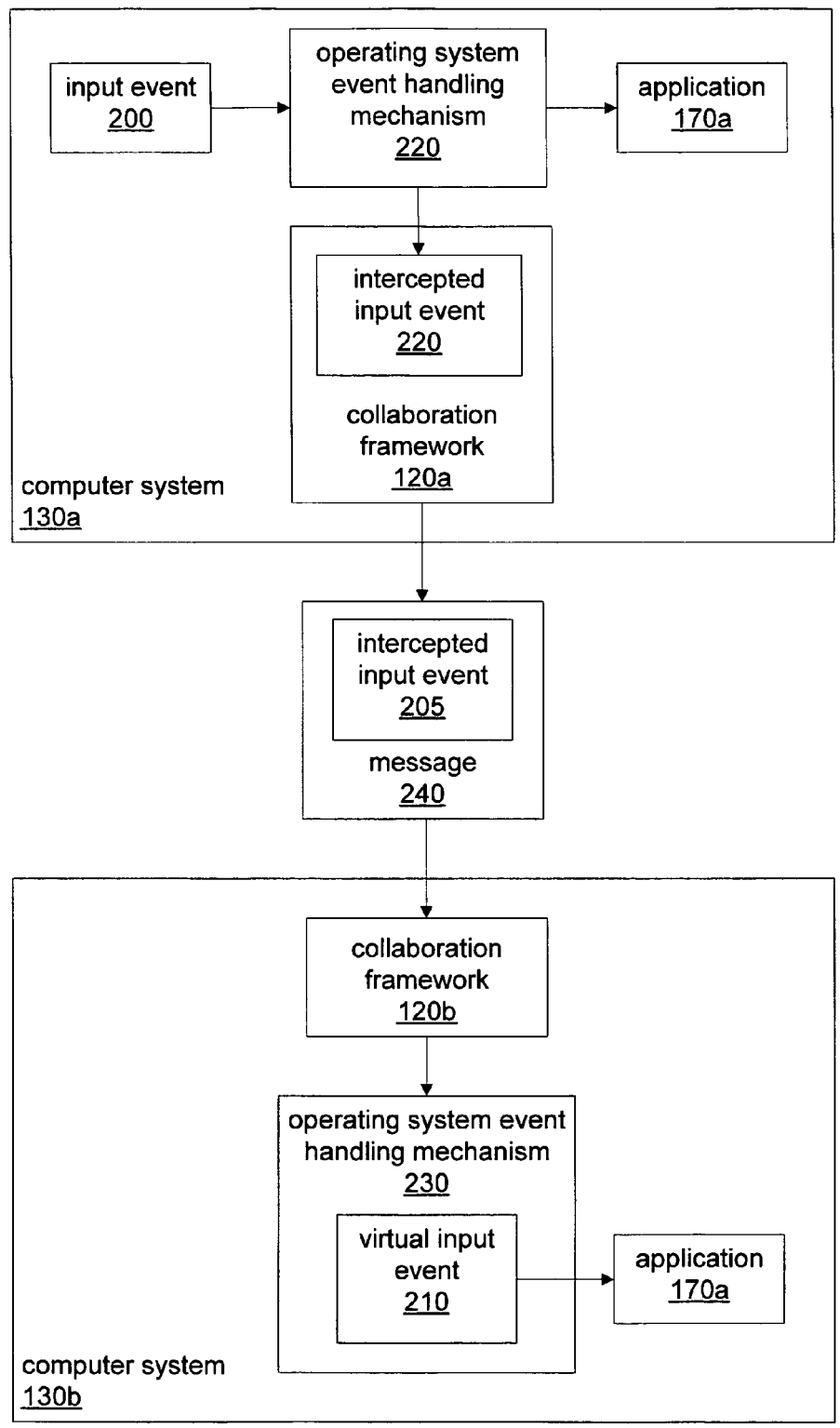
FIG. 2 illustrates one embodiment of event-based collaboration between two computer systems.

FIG. 2 is a block diagram illustrating event-based collaboration between two computer systems, according to some embodiments. As illustrated by FIG. 2, collaboration framework 120a may intercept input event 200 for application 170a, according to one embodiment. For instance, application 170a may be viewing a document in use by a presenter using computer system 130a for a collaboration session with a user of computer system 130b. Alternatively, in other embodiments, two colleagues may be collaborating on a single document. Application 170 may be executing on both computer systems, and the same document may be open in both instances of application 170, according to some embodiments. Thus, in some embodiments, collaboration framework 120a may intercept input event 200 via operating system event handling mechanism 220. Collaboration framework 120a may transmit the intercepted input event 205 to collaboration framework 120b on computer system 130b, according to one embodiment. In some embodiments, collaboration framework 120a may send intercepted input event 205 within a message, such as message 140 that may also include other information not illustrated. Intercepted input events may be transmitted to other collaboration frameworks using any of a number of network protocols, such as TCP/IP, UDP, SNMP, etc. After receiving intercepted input event 205, collaboration framework 120b on computer system 130b may then deliver the input event, or a virtual input event corresponding to the input event, to application 170b. In one embodiment, collaboration framework 120b may deliver the input event to application 170b via operating system event handling mechanism 130 on computer system 130b.

For example, application 170a may be a calendar application and collaboration framework 120a may intercept input events creating (or modifying) a meeting or other calendar event in application 170a. Collaboration framework 120a may transmit those intercepted events to collaboration framework 120b and collaboration framework 120b may deliver those events to application 170b resulting in the same meeting being created (or modified) in application 170b on computer system 130b.

Collaboration frameworks may utilize existing event handling mechanisms of operating systems, in some embodiments. For example, in one embodiment, collaboration framework 120a may intercept input events by registering with an operating system on computer system 130a to receive all input events for application 170a. In another embodiment, collaboration framework 120a may install a callback function with an operating system mechanism on computer system 130a in order to receiving input events for application 170a. In yet another embodiment, collaboration framework 120a may install its own event handler via operating system event handling mechanism 220. In still additional embodiments, collaboration framework 120a may interact with operating system event handling mechanism 220 to capture raw events and may analyze and interpret the captured raw events to determine input events for application 170a. In general, event-based collaboration may be implemented using any suitable mechanism for intercepting or capturing system and application input events In one embodiment, application 170a and application 170b may be instances of the same application running on different computer systems. For example, in one embodiment, applications 170a and 170b may both be instances of the same web browser application. In other embodiments, however, applications 170a and 170b may be different applications that perform compatible functions. For instance, application 170a may be one web browser application, such as Netscape, while application 170b may be another application, such as Microsoft Internet Explorer. When using event-based collaboration with different applications, the collaboration framework on the receiving computer system may be configured to translate or modify the input events into a corresponding format compatible with application(s) executing on that computer system. Alternatively, the receiving collaboration framework may deliver additional events to have the receiving application perform the same functions as the presenter's application.

While FIGS. 1 and 2 illustrate a single application for which events are intercepted, in some embodiments a collaboration session may involve more than one application and thus, collaboration framework 120a may intercept events to more than one application. For example, a presenter may lead a collaboration session using both a web browser to view web content and a slide show application. When intercepting events for more than one application, collaboration framework 120a may send events for multiple applications to other participating collaboration frameworks in one or more messages. As another example, a system administrator may modify and/or adjust various settings in a computer system using various applications and, according to one embodiment, a collaboration framework may intercept the input events involved and transmit them to collaboration frameworks on other computer systems which, in turn, may deliver those events to corresponding applications on the other computer systems. Thus, in some embodiments, event-based collaboration may enable a system administrator to update or modify settings, applications, or other features of multiple computer systems by performing the actual updating on a single computer system and relying upon event-based collaboration to perform those same updates on the other computer systems. In some embodiments, collaboration framework 120a may include events for more than one application in a single message to other frameworks. In other embodiments, however, collaboration framework 120a may only include events for a single application in a single message. Additionally, collaboration framework 120a may include a user interface allowing a presenter or other user of collaboration framework 120 to specify or select an application for which events should be intercepted and thus, which application should be included in a collaboration session.

Figure 3A:
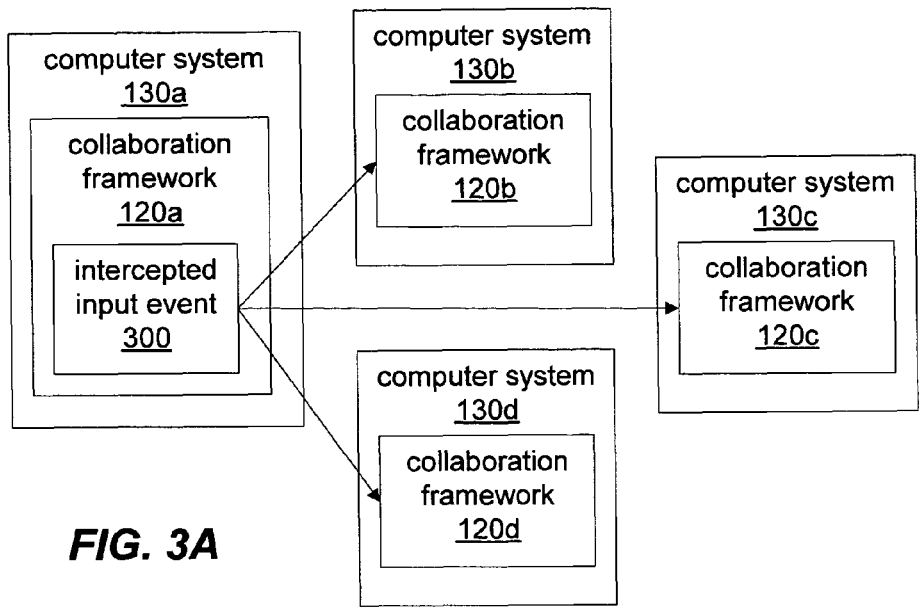
FIGS. 3A-3C are block diagrams illustrating various stages of event-based collaboration, in one embodiment.
Figure 3B:
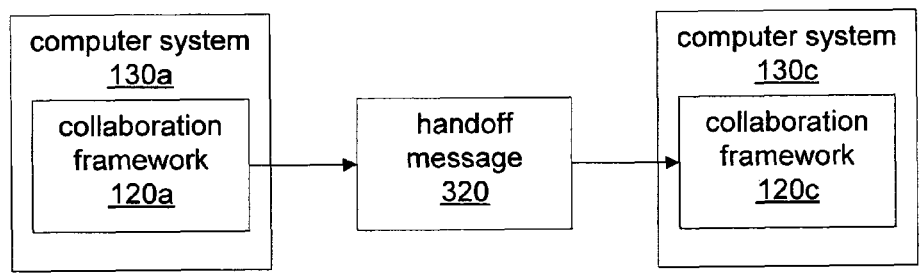
Figure 3C:
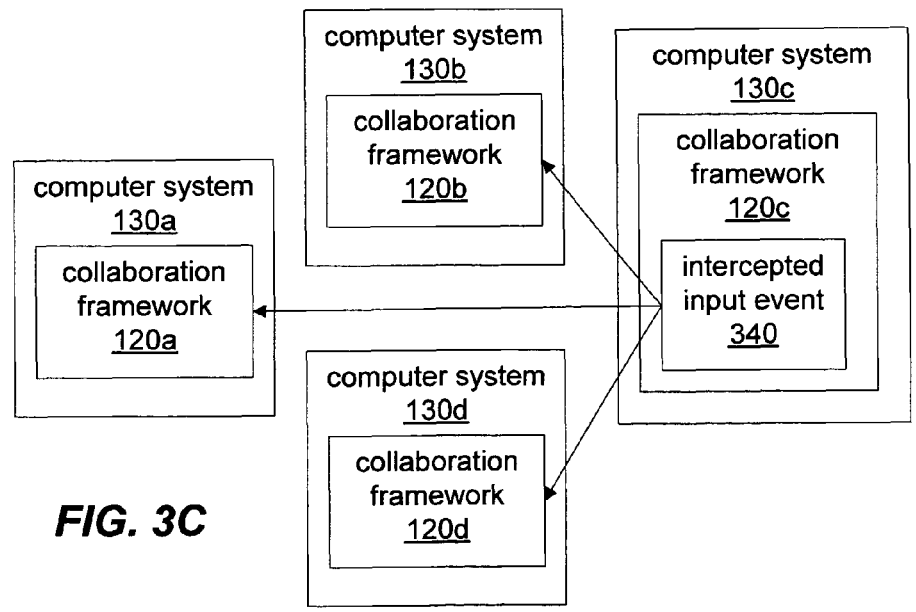

FIGS. 3A-3C are block diagrams illustrating various stages of event-based collaboration, in one embodiment. Specifically, FIG. 3A illustrates event-based collaboration where collaboration framework 120*a* may intercept input events on computer system 130*a* and send the intercepted events to collaboration frameworks 120*b*, 120*c*, and 120*d* on computer systems 130*b*, 130*c*, and 130*d*, respectively. When beginning a collaboration session, the presenting collaboration framework may send a session start message to other participating collaboration frameworks signaling the start of the collaboration session. In some embodiments, a session start message may include a list of the participants and/or information indicating how to send collaboration messages to each of the participants. For example, a session start message may include an IP address for each participating computer. Alternatively, a session start message may include an email address or an instant messaging user name for each participant in the collaboration session. Additionally, a session start message may include information indicating one or more applications to be used during the collaboration session.

In some embodiments, more than one participant may act as presenter for a collaboration session. FIG. 3B illustrates the sending of a handoff message from collaboration framework 120*a* to collaboration framework 120*c* to handoff the presentation functions for the collaboration session from computer system 130*a* to computer system 130*b*. A presenter may wish to handoff a presentation to a colleague, or alternatively, a number of people may be participating in a group session and may each wish to contribute. Thus, in some embodiments, a hand-off message may be used both to relinquish control of the collaboration session and to signal the next presenter. A collaboration framework may include a user interface allowing the user to hand-off control, or presenter functions, for the collaboration session to another participant. A collaboration framework may also include a user interface allowing a participant desiring to become a presenter in a collaboration framework to request the current presenter to hand-off control of the session. Additionally, in some embodiments, a collaboration framework may include a user interface allowing a participant to switch between presenting and non-presenting modes of collaboration.

In one embodiment, collaboration framework 120*a* may receive user input requesting a hand-off to another participant in the collaboration session. For example, collaboration framework 120*a* may be configured to present a list of all the participants, such as in a popup menu, or other graphical element, allowing the user to select one of the other participants to take over control of the collaboration session. In response to receiving such input, collaboration framework 120*a* may send a hand-off message to the collaboration framework on the selected participant's computer system. Collaboration framework 120*a* may send a hand-off message using any of a number of suitable messaging protocols.

FIG. 3C illustrates collaboration framework 120*c*, in response to receiving handoff message 320, intercepting input events on computer system 130*c* and sending those intercepted input events to the other collaboration frameworks. For instance, collaboration framework 120*c* may receive a hand-off message from collaboration framework 120*a* and in response may begin capturing input events and transmitting them to other collaboration frameworks. In one embodiment, collaboration framework 120*c* may also send a hand-off acknowledgement message to collaboration framework 120*a* acknowledging receipt of the hand-off message and/or acceptance by the user of control of the collaboration session. After receiving and possibly acknowledging a hand-off message from another collaboration framework, collaboration framework 120*c* may begin capturing and transmitting input events to the other collaboration frameworks using techniques described herein above. Thus, multiple participants in a collaboration session may be a presenter in the session in turn through the use of hand-off messages between collaboration frameworks.

Figure 4:
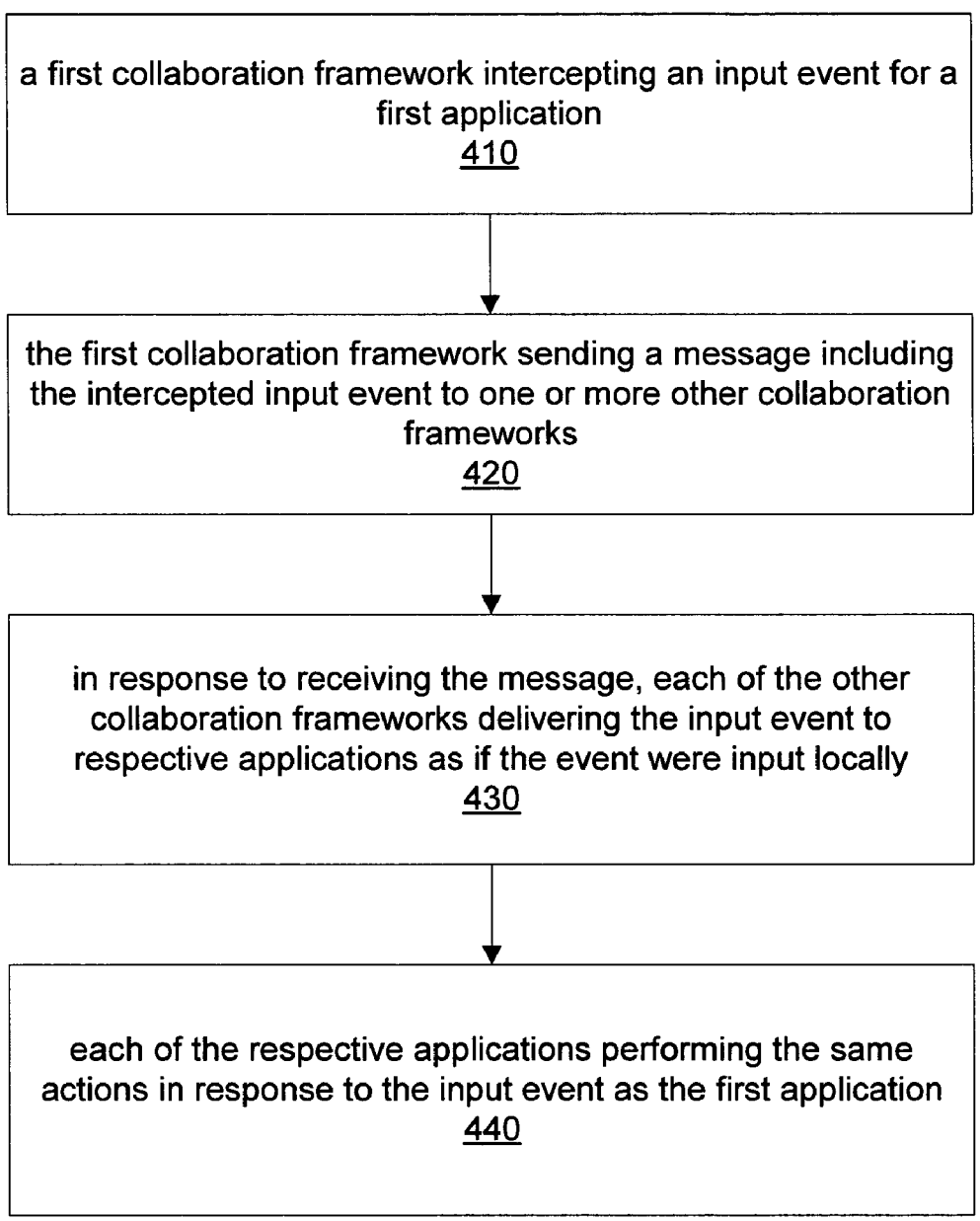
FIG. 4 is a flowchart illustrating one embodiment of a method for event-based collaboration.

FIG. 4 is a flowchart illustrating one embodiment of a method for event-based collaboration. A first collaboration framework may intercept an event, such as an input event, for a first application, as illustrated by block 410. For example, collaboration framework 120*a* on computer system 130*a* may intercept input event 200 for application 170*a*. As noted above, events may be intercepted via an operating system event handling mechanism on computer 130*a*. For instance, collaboration framework 120*a* may register a callback function with an operating system on computer system 130*a* to receive events for application 170*a*. Alternatively, in another embodiment, collaboration framework 120*a* may register to receive all events input on computer system 130*a* and thus, may examine or analyze events input on computer system 130*a* to determine which events are for application 170*a*. In yet other embodiments, collaboration framework 120*a* may also install custom software on computer system 130*a* that replaces an event handling mechanism of the operating system on computer system 130*a* and that performs event handling for the operating system, but also may intercept events for application 170*a*.

In some embodiments, collaboration framework 120*a* may deliver, either directly, or via the same event handling mechanism, the event to application 170*a* and application 170*a* may perform one or more actions or functions related to the input event(s). The first collaboration framework may send a message including the intercepted input event to one or more other collaboration frameworks, as illustrated by block 420. For instance, collaboration framework 120*a* may send a message including the intercepted event to other collaboration frameworks participating in the collaboration session. Collaboration frameworks may deliver messages including intercepted events in any of a number of ways, including network messages, such as TCP/IP message, UDP messages, email, instant messages, etc. In general, as discussed above, collaboration frameworks may communicate using any network protocol suitable for exchanging data between processes on computers.

When sending messages including intercepted events to other participating collaboration frameworks, collaboration framework may include other information or data in the message with the intercepted event. For example, collaboration framework 120*a* may include an event identifier in each event message indicating the order the events were intercepted and sent by collaboration framework 120*a*. Thus, receiving collaboration frameworks may be able to detect that a message was received out of order, such as due to network traffic. Additionally, if a message is received out of order the receiving collaboration framework may be able to correct the situation by using event identifiers included in the messages to ensure that the events are delivered to the instance of application 170 in the correct order. Other information that collaboration framework 120*a* may, in some embodiments, include in messages with intercepted events may also include a timestamp, information identifying the particular collaboration session, information identifying the application for which the event is intended, and/or information identifying a document to which the event refers, among other information.

In some embodiments, collaboration framework 120a may send all events for application 170a, while, in other embodiments, collaboration framework 120a may only send certain types of events for application 170a. For example, collaboration framework 120a may only send intercepted user events for application 170a. In another example, collaboration framework 120a may send intercepted user events and display events for application 170a to other participating collaboration frameworks. In some embodiments, collaboration framework 120a may not send intercepted events that are not appropriate or relevant to the collaboration session. For instance, collaboration framework 120a may not send intercepting events related to moving or resizing application 170a because each participant in the collaboration session may move or resize their instance of application 170a differently as required by their particular computer system's display characteristics. Alternatively, in some embodiments, collaboration framework 120a may send resizing and/or moving related events for application 170a to other participating collaboration frameworks. For example, a particular collaboration session may require that all instances of application 170 be the same size. In some embodiments, collaboration framework 120a may include a user interface that allows a presenter of a collaboration session or other user of collaboration framework 120a to specify whether or not collaboration framework 120a should intercept all events and if not, which events to intercept and send to other participating collaboration frameworks.

In some embodiments, collaboration framework 120a may include more than one event in a single message to other participating collaboration frameworks. For instance, if two events are intercepting close together in time, collaboration framework 120a may include both intercepted events in a single event message to other participating collaboration frameworks. Additionally, as will be discussed in more detail below regarding FIG. 6, collaboration framework 120 may send special event messages including one or more events intercepted and sent previously. For instance, one of the other participating collaboration frameworks may have detected that several messages including events may have been missed or were corrupted and may request that collaboration framework 120a re-send those events. In response, collaboration framework 120a may resend the requested events in a single message only to the requesting collaboration framework.

In response to receiving the message, each of the other collaboration frameworks may deliver the input event to respective applications as if the event were input locally, as illustrated by block 430. For instance, a second collaboration framework, such as collaboration framework 120b may receive a message including an intercepted event from collaboration framework 120b as part of a collaboration session and may deliver the event from the message to application 170b as if the event were input locally. For instance, collaboration framework 120b may call an event delivery mechanism of the operating system on computer system 130b. Alternatively, in another embodiment, collaboration framework 120b may insert the event directly into an event queue for application 170b.

The instances of application 170 on the receiving participants' computer systems may perform the same actions or functions as the presenter's instance of application 170 in response to the received input events. Thus, all the participants, including the presenter, see the same view of the data, document(s), or other materials used during the collaboration session.

In some embodiments, messages including intercepted events may include information indicating the application for which they are intended. When a collaboration framework receives a message including an intercepted event for an application that is not currently executing the collaboration framework may execute or launch an instance of that application. Alternatively, the receiving collaboration framework may launch a different application that performs similarly to the indicated application. For example, in a collaboration session that includes using a web browser, different web browsers (such as Netscape, Internet Explorer, Mozilla, etc) may be used by different participants. Therefore, in one embodiment, collaboration frameworks on the different participants' computer systems might launch different web browsers. This may be especially true when different participants are running different operating systems. For example, the presenter may be presenting using SUN OS while one of the participants may be using the Apple Macintosh operating system. In such an example, the presenter may intercept and send events for an instance of the Mozilla web browser and the collaboration framework on the Macintosh system may launch, and deliver received events to, Microsoft Internet Explorer for Macintosh. In general, any application that performs similarly to the application in use by the presenter of the collaboration session may be used on other participating computer systems during event-based collaboration.

Additionally, each of the respective applications may perform the same actions in response to the input event as the first application, as illustrated by block 440. Application 170a on computer system 130a may perform one or more actions resulting from the delivery of an event that was also intercepted by collaboration framework 120a. For example, collaboration framework 120a may intercept an input event that when delivered to application 170a may cause application 170a to move to a next page of a multi-page document. When that same event is received by other participating collaboration frameworks and delivered to other respective instances of application 170, each of those instances of application 170 may perform the same action, i.e. they each may display the same page of the same document.

Figure 5:
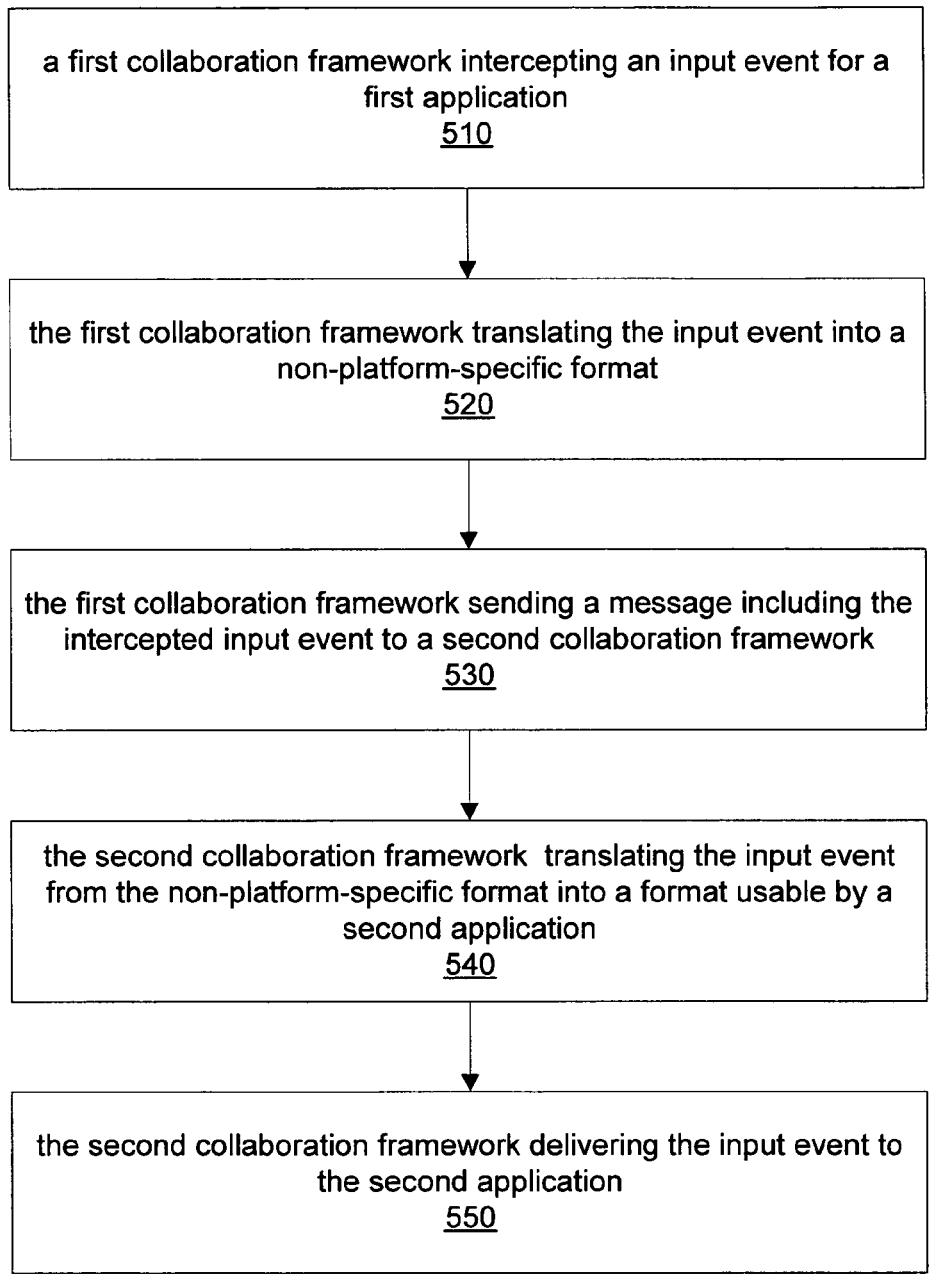
FIG. 5 is a flowchart illustrating one embodiment of a method for event-based collaboration including event translation.

FIG. 5 is a flowchart illustrating one embodiment of a method for event-based collaboration including event translation. A first collaboration framework may, as illustrated by block 510, intercept an input event for a first application. As discussed above, collaboration framework 120a may intercept events for application 170a via an event handling mechanism of an operating system on computer system 130a, according to some embodiments. After intercepting an event for application 170a, collaboration framework 120a may translate the intercepted input event into a non-platform-specific format, as illustrated by block 520. For instance, one or more participants in a collaboration session may be using computers of differing characteristics and input events for one platform or computer system may need to be translated into a format appropriate for another platform or computer system. For instance, input events captured on a computer system that includes a graphical display device configured for a high resolution may need to be translated into a different resolution for a computer system with a graphical display device configured for a lower resolution. Thus, in some embodiments, a collaboration framework, such as collaboration framework 120a may translate part of all of the information of an input event into a non-platform-specific format. For example, collaboration framework 120a may translate X and Y coordinate values for a mouse input event into a more general coordinate system before sending the intercepted input events to other collaboration frameworks.

As illustrated by block 530, the first collaboration framework may send a message including the translated intercepted input event to a second collaboration framework. As discussed herein above, collaboration framework 120*a* may send an intercepted event to other participating collaboration frameworks. After receiving the message including the intercepted event, the receiving collaboration framework may translate the received input event from the non-platform-specific format into a format usable by a second application, as illustrated by block 540. A collaboration framework receiving an input event from another collaboration framework may translate the received event, or part of the received event from a non-platform-specific format into a format usable by another application or platform. For example, collaboration frameworks may be configured to send intercepted input events using a common coordinate system and a collaboration framework receiving an input event with coordinates in the common coordinate system may translate those coordinates into a coordinate system for the platform on which it is executing.

When translating coordinates of input events from (or to) a common coordinate system, a collaboration framework may translate to (or from) coordinate systems for a computer system in general, or to a coordinate system for a specific application. For example, a captured mouse input event may include coordinate values relative to a specific application or application window and may be translated from the coordinate system of the application to a common coordinate system. Upon receiving a mouse input event in the common coordinate system, a receiving collaboration framework may translate the coordinates of the mouse input event from the common coordinate system to a coordinate system specific to the application the event may be delivered to, according to one embodiment. The second collaboration framework may also deliver the input event to the second application, as illustrated by block 550. As noted above, the receiving collaboration framework may deliver the translated input event to the collaboration application.

Figure 6:
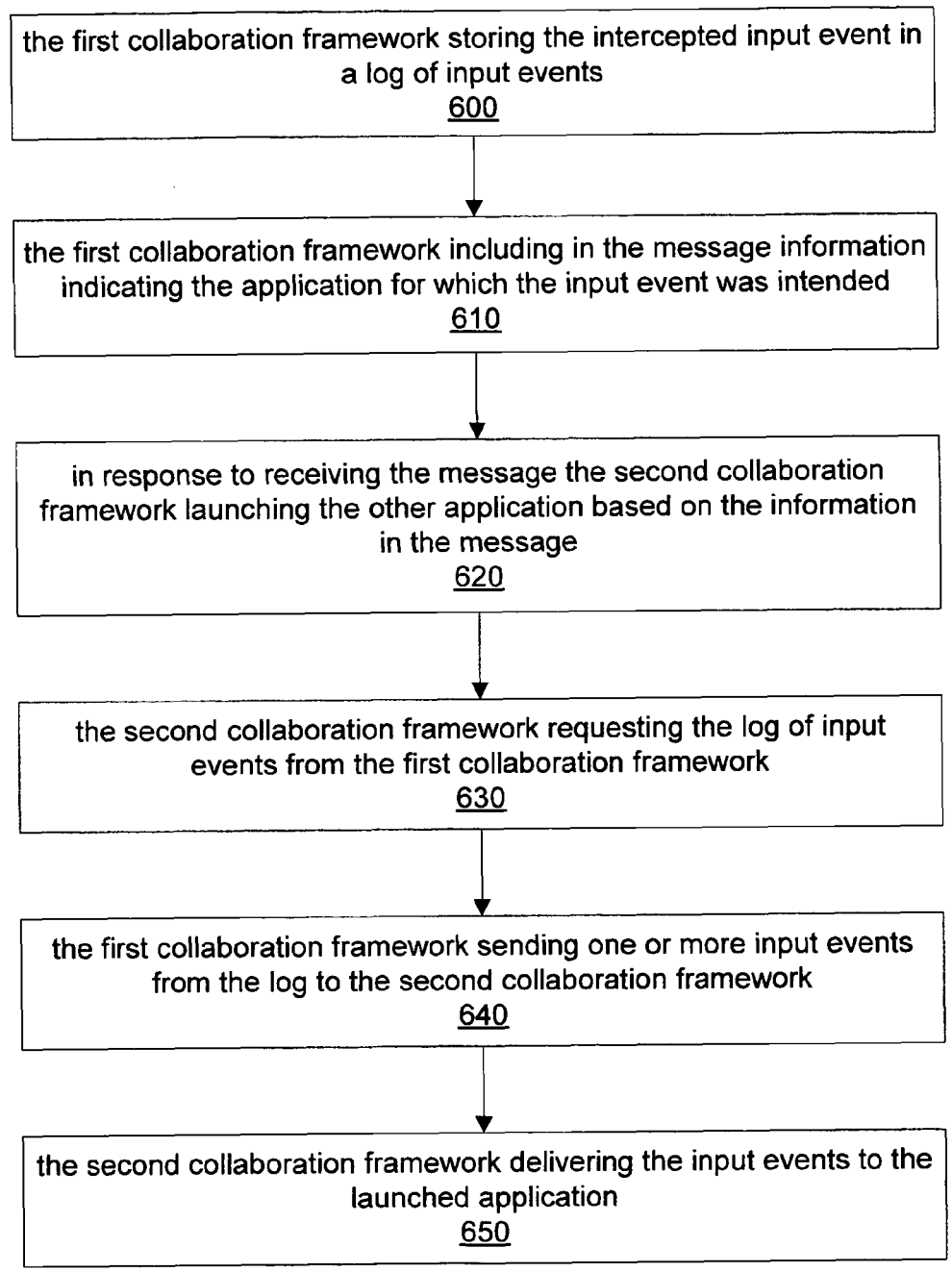
FIG. 6 is a flowchart illustrating one embodiment of a method for utilizing logging in event-based collaboration.

FIG. 6 is a flowchart illustrating one embodiment of a method for utilizing logging in event-based collaboration. A first collaboration framework may store intercepted input events in a log for intercepted input events, as illustrated by block 600. For instance, collaboration framework 120*a* may store each intercepted event in a log configured to store intercepted events. Collaboration framework 120*a* may also store other information in the log with the intercepted events. For example, collaboration framework 120*a* may store information about the application for which the event was intended or may also store information about the collaboration session during which the event was intercepted. In general, collaboration frameworks, such as collaboration framework 120*a*, may include a user interface allowing a presenter of a collaboration session to instruct a collaboration framework whether or not to record or log intercepted events. Alternatively, a separate collaboration framework may record or log all events received in messages from a presenter's collaboration framework.

The first collaboration framework may include information indicating the application for which the input event was intended, in a message also including the input event when sending such a message to other collaboration frameworks, as illustrated by block 610. In response to receiving such message, a second collaboration framework may launch an instance of the application for which the input event was intended, as indicated by the information in the message, as illustrated by block 620.

The second collaboration framework may also request one or more input events from the log of intercepted input events from the first collaboration framework, as illustrated by block 630. For example, a participant may have joined the collaboration session late and therefore may have missed a number of input events. In order to synchronize with the other participants, the collaboration framework may, either automatically or in response to user input, request input events that may have been missed. Alternatively, a collaboration framework may detect that it has missed one or more input events, such as due to network errors, or a local computer issue. For example, each message from the controlling collaboration framework may include a consecutive message number and a collaboration framework may be configured to detect a missed message. In response, the collaboration framework may send a message to the controlling collaboration framework requesting the missed input events.

The first collaboration framework may send one or more input events from the log to the second collaboration framework, as illustrated by block 640. When sending previously intercepted and logged input events, a collaboration framework, such as collaboration framework 120*a*, may send the events in one or more messages to the requesting collaboration framework. In one embodiment, collaboration framework 120*a* may send each event in a separate message, as they were originally sent to participating collaboration frameworks. In other embodiments, however, collaboration framework 120*a* may send multiple events per message to make more efficient use of network resources. Alternatively, in yet another embodiment, collaboration framework 120*a* may send a single message or document including all requested logged events. The second collaboration framework may deliver the received input events to the launched application, as illustrated by block 650. The collaboration framework may deliver the events in the same order they were captured so as to ensure the synchronization of the applications.

Additionally, in some embodiments, collaboration framework 120*a* may record or log intercepted input events in order to play back those events in another collaboration session. For example, a presenter may use collaboration framework 120*a* to record the events of a collaboration session and may re-present the same collaboration session by instructing collaboration session 120*a* to replay the collaboration session by reading the intercepted events from a log, or other file, and sending them in order, and at the correct time intervals, to other participating collaboration frameworks. Additionally, the log or another file including intercepted events may be transferred to another computer system and a collaboration framework on that computer system may read and replay the events from the transferred log in order to replay the collaboration session in which the events were recorded. In other words, a log of intercepted events may include all the information required to replay or re-present the same collaboration session any number of times on different computer systems. For example, a company may present a collaboration session regarding using a new product and may make a log of the session available to employees that could not take part in the original collaboration session to replay the session at a later time, according to one embodiment.

Figure 7:
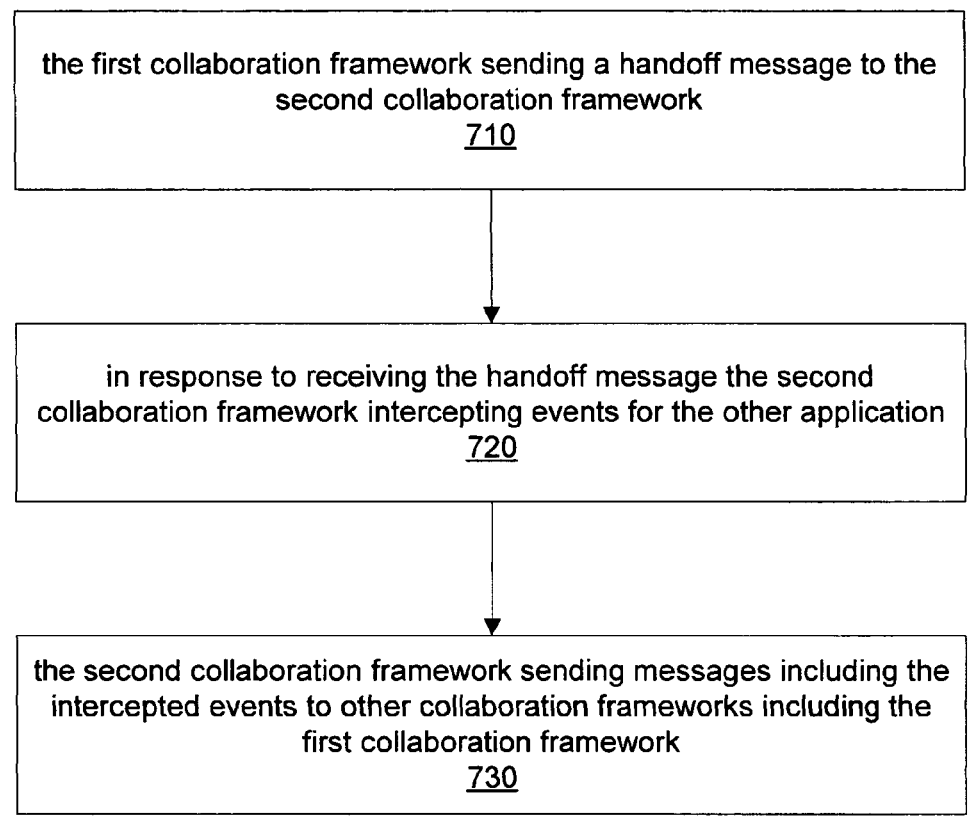
FIG. 7 is a flowchart illustrating one embodiment of a method for transferring control in an event-based collaboration implementation.

FIG. 7 is a flowchart illustrating one embodiment of a method for transferring control in an event-based collaboration implementation. For instance, a collaboration session may involve more than one presenter and the first presenter may hand off control of the collaboration session to another participant, who subsequently becomes the presenter. A first collaboration framework may send a hand-off message to a second collaboration framework, as illustrated by block 710.

A hand-off message may include only information indicating the new presenter, in one embodiment. In another embodiment, a hand-off message may also include information indicating the previous presenter that is handing off control of the session. In one embodiment a hand-off message may be sent to all participant information them of which collaboration framework or which participant is not presenting the collaboration session. Alternatively, the hand-off message may only be sent to the new presenter.

In some embodiments, the collaboration framework receiving a hand-off message may send a hand-off acknowledgment message to the framework that sent the hand-off message. The use of a hand-off acknowledgment message may prevent a collaboration session from being in a state without a presenter. In one embodiment, the collaboration framework may also present a user interface allowing the participant to accept or deny responsibility for presenting the collaboration session. Thus, in some embodiments, a collaboration framework may send a hand-off message to a second collaboration framework and may receive a denial message from the second collaboration framework and may therefore remain the presenter of the collaboration session.

The second collaboration framework may, in response to receiving the hand-off message, intercept input event for another application, as illustrated by block 720. After receiving, and possibly acknowledging a hand-off message, a collaboration framework may begin intercepting events for one or more applications. The receiving collaboration framework may also present a user interface message to inform the participant that they are now the presenter. Additionally, the collaboration framework may also include a user interface to allow the user to re-configure one or more collaboration characteristics, such as what applications from which to intercept events, and what types of event to intercept.

The second collaboration framework may also send messages including the intercepted input events to other collaboration frameworks including the first collaboration framework. After accepting a hand-off from another collaboration framework, a second collaboration framework may send intercepted events to the other participating collaboration frameworks. The method and manner of sending intercepted events after a hand-off are the same as used before a hand-off, as described above.

Figure 8:
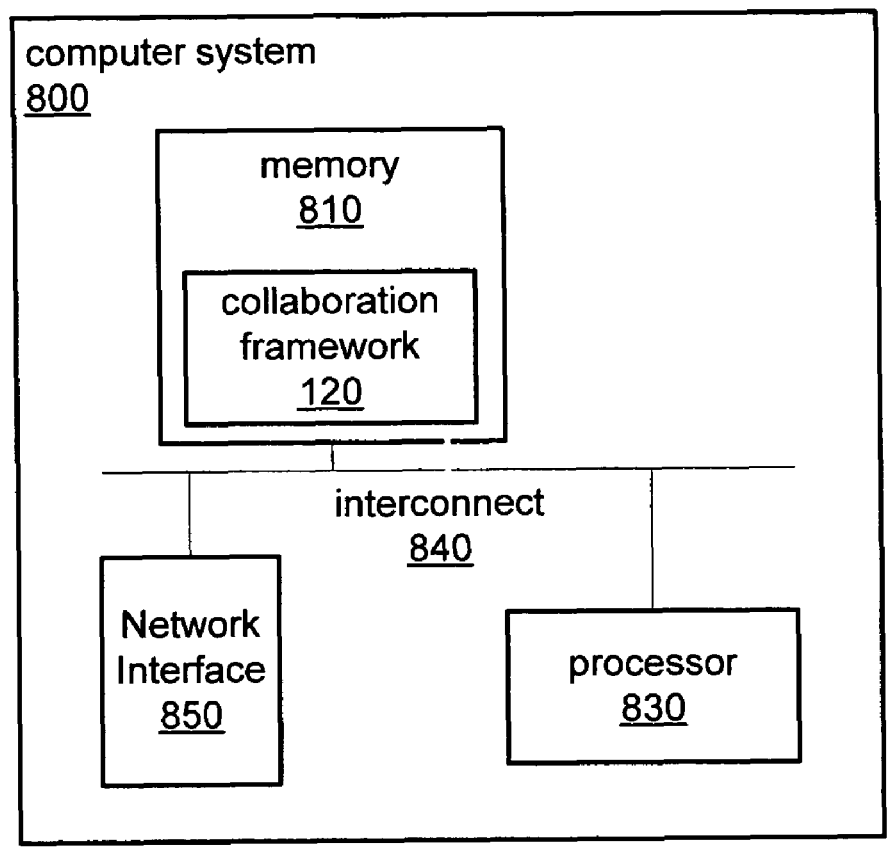
FIG. 8 is a block diagram illustrating an exemplary computer system suitable for implementing event-based collaboration, according to one embodiment.

FIG. 8 illustrates a computing system capable of adaptive instrumentation as described herein and according to various embodiments. Computer system 800 may be any of various types of devices, including, but not limited to, a personal computer system, desktop computer, laptop or notebook computer, mainframe computer system, handheld computer, workstation, network computer, a consumer device, or any type of networkable peripheral device such as storage devices, switches, modems, routers, etc, or in general any type of networkable computing device. Computer system 800 may include at least one processor 830. Processor 830 may couple across interconnect 840 to memory 810.

Memory 810 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 810 may include program instructions configured to implement event-based collaboration, as described herein. In certain embodiments memory 810 may include program instructions configured to implement a collaboration framework, such as a collaboration framework 120. In such embodiments, collaboration framework 120 may include program instructions configured to implement event-based collaboration, as described herein.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:

executing, by a first computer system, a first collaboration framework and an instance of an application, wherein executing the instance of the application comprises displaying an instance of a graphical user interface of the application on the first computer system;

the first collaboration framework intercepting, via an operating system event handling mechanism on the first computer system, a local user input event targeted to the instance of the application, wherein the instance of the application applies a modification to the instance of the graphical user interface in response to receiving the user input event;

in response to said intercepting, the first collaboration framework sending a message including the user input event to one or more other collaboration frameworks each executing on a respective other computer system that is executing a respective other instance of the application, wherein said executing each respective other instance of the application comprises displaying a respective other instance of the graphical user interface of the application on the respective other computer system;

in response to receiving the message, each of the one or more other collaboration frameworks delivering, via an operating system event handling mechanism on the respective other computer system, the user input event to the respective other instance of the application executing on the respective other computer system, displays a respective other user interface; wherein the operating system event handling mechanism delivers the user input event to the respective other application as if the user input event originated locally from the respective other user interface displayed by the respective other application; and in response to receiving the user input event, the respective other instance of the application applying the modification to the respective other instance of the graphical user interface of the application displayed by the respective other computer system.

2. The method of claim 1, wherein said intercepting comprises monitoring an event queue of the operating system event handling mechanism for the input event.

3. The method of claim 1, wherein the input event is one of a mouse event, a keyboard event, or a pointer event.

4. The method of claim 1, wherein said intercepting comprises the collaboration framework on the first computer system registering with the operating system event handling mechanism to receive, through a callback function, the input event.

5. The method of claim 1, wherein said intercepting comprises:
- the collaboration framework on the first computer system capturing raw keyboard and mouse events; and
- the collaboration framework on the first computer system analyzing each captured event to determine whether the event is for the application.

6. The method of claim 1, wherein said delivering comprises inserting the input event into an event queue of the operating system event handling mechanism on the respective other computer system.

7. The method of claim 1, wherein the input event comprises a horizontal coordinate and a vertical coordinate, the method further comprising each of the one or more other collaboration frameworks translating the horizontal and vertical coordinates from a coordinate system of the instance of the application to a coordinate system of the respective other instance of the application.

8. The method of claim 1, further comprising the first collaboration framework translating the input event to a non-platform-specific format prior to said sending a message.

9. The method of claim 8, wherein the input event comprises a horizontal coordinate and an vertical coordinate; and wherein said translating the input event to a non-platform-specific format comprises the first collaboration framework translating the horizontal and vertical coordinates from a coordinate system of the instance of the application to a non-platform-specific coordinate system.

10. The method of claim 8, further comprising each of the one or more other collaboration frameworks translating the received input event from the non-platform-specific format into a format usable by the respective other instance of the application prior to delivering the input event to the respective other instance of the application.

11. The method of claim 10, wherein the input event comprises a horizontal coordinate and a vertical coordinate, the method further comprising each of the one or more other collaboration frameworks translating the horizontal and vertical coordinates to a coordinate system of the respective other instance of the application prior to delivering the input event to the respective other instance of the application.

12. The method of claim 1, wherein the message comprises information identifying the application, the method further comprising the one or more of the other collaboration frameworks launching the respective other instances of the application in response to receiving the input event and based on the information identifying the application.

13. The method of claim 1, wherein said sending the message comprises sending the message to yet another collaboration framework executing on yet another computer system, wherein the yet another computer system executes a different application than the application; the method further comprising the yet another collaboration framework translating the received input event into a format understandable by the different application.

14. The method of claim 1, wherein the input event corresponds to a document opening in the instance of the application, the method further comprising:
- the first collaboration framework sending the document opened in the respective other instance of the application to each of the other collaboration frameworks; and
- in response to receiving the document, each of the one or more other collaboration frameworks instructing the respective other instance of the application to open the document.

15. The method of claim 1, further comprising:
- the first collaboration framework sending a hand-off message to a second collaboration framework of the one or more other collaboration frameworks; and
- in response to receiving the hand-off message, the second collaboration framework:
  - intercepting a local user input event targeted to a second instance of the respective other instances of the application; and
  - sending a message including the intercepted local input event of the second instance of the application to the first collaboration framework and to each other one of the one or more other collaboration frameworks.

16. The method of claim 15, further comprising:
- the first collaboration framework receiving the message from the second collaboration framework; and
- the first collaboration framework delivering the intercepted local input event of the second instance of the application in the message to the instance of the application.

17. The method of claim 1, further comprising:
- the first collaboration framework storing the input event in a log of intercepted input events;
- one of the one or more other collaboration frameworks requesting one or more input events from the log;
- the first collaboration framework sending the one or more input events from the log to the requesting collaboration framework; and
- the requesting collaboration framework:
  - receiving the one or more input events from the log; and
  - delivering the one or more input events from the log to the respective other instance of the application.

18. A device, comprising:
- a processor; and
- a memory coupled to the processor, wherein the memory comprises program instructions configured to:
  - execute a first collaboration framework and an instance of an application, wherein executing the instance of the application comprises displaying an instance of a graphical user interface of the application;
  - wherein the first collaboration framework is configured to:
    - intercept, via an operating system event handling mechanism executing on the device, a local user input event targeted to the instance of the application, wherein the instance of the application applies a modification to the instance of the graphical user interface in response to receiving the user input event;
    - in response to said intercepting, send a message including the user input event to each of one or more other collaboration frameworks each executing on one of a respective one or more other devices that are each executing a respective other instance of the application, wherein said executing each respective other instance of the application comprises displaying a respective other instance of the graphical user interface of the application on the respective other device;
    - wherein the message includes information usable by each of the one or more other collaboration frameworks to deliver the user input event, via an operating system event handling mechanism executing on the respective other device, to the respective other instance of the application executing on the respective other device as if the user input event originated locally from the respective other user interface displayed by the respective other application on the respective other device; and wherein the delivered user input event causes each of the respective other application instances to apply the modification to the respective instance of the graphical user interface.

19. The device of claim 18, wherein as part of said intercepting the first collaboration framework is configured to monitor an event queue of the operating system event handling mechanism for the input event.

20. The device of claim 18, wherein as part of said intercepting the first collaboration framework is configured to register with the event handling mechanism to receive, through a callback function, the input event.

21. The device of claim 18, further comprising:
a keyboard; and
a mouse;
wherein said as part of said intercepting the first collaboration framework is configured to:
capture raw keyboard and mouse events; and
analyze each captured event to determine whether the event is for the application.

22. The device of claim 18, wherein the first collaboration framework is further configured to translate the input event to a non-platform-specific format prior to sending a message including the input event.

23. The device of claim 22, wherein the input event comprises a horizontal coordinate and a vertical coordinate; and wherein the first collaboration framework is further configured to translate the horizontal and vertical coordinates from a coordinate system of the instance of the application to a non-platform-specific coordinate system prior to sending a message including the input event.

24. The device of claim 23, wherein the first collaboration framework is configured to receive a message including an input event from one of the other collaboration frameworks, wherein the input event from the received message comprises a horizontal coordinate and an vertical coordinate; and wherein the first collaboration framework is configured to translate the horizontal and vertical coordinates of the input event from the received message to a coordinate system of the instance of the application.

25. The device of claim 18, wherein the first collaboration framework is further configured to send a document in use by the instance of the application to each of the other collaboration frameworks.

26. The device of claim 18, wherein the first collaboration framework is further configured to:
store the input event in a log of intercepted input events; and
in response to one or more of the one or more other collaboration frameworks requesting one or more of the input events in the log, send one or more input events from the log to the one or more requesting collaboration frameworks.

27. A computer accessible medium, comprising program instructions configured to implement:
executing on a first computer system, a first collaboration framework and an instance of an application, wherein executing the instance of the application comprises displaying an instance of a graphical user interface of the application;
intercepting, via an operating system event handling mechanism executing on the first computer system, a local user input event targeted to the instance of the application, wherein the instance of the application applies a modification to the instance of the graphical user interface in response to receiving the user input event;
in response to said intercepting, the first collaboration framework sending a message including the user input event to each of one or more other collaboration frameworks each executing on one of a respective one or more other computer systems that are each executing a respective other instance of the application, wherein said executing each respective other instance of the application comprises displaying a respective other instance of the graphical user interface of the application on the respective other computer system;
wherein the message includes information usable by each of the one or more other collaboration frameworks to deliver the user input event, via an operating system event handling mechanism executing on the respective other computer system, to the respective other instance of the application executing on the respective other device as if the user input event originated locally from the respective other user interface displayed by the respective other application on the respective other device; and
wherein the delivered user input event causes each of the respective other application instances to apply the modification to the respective instance of the graphical user interface.

28. The computer accessible medium of claim 27, wherein as part of said intercepting, the program instructions are configured to implement monitoring an event queue of the operating system event handling mechanism for the input event.

29. The computer accessible medium of claim 27, wherein as part of said intercepting the program instructions are further configured to implement the collaboration framework on the first computer system registering with the operating system event handling mechanism to receive, through a callback function, the input event.

30. The computer accessible medium of claim 27, wherein as part of said intercepting the program instructions are configured to implement:
the first collaboration framework capturing raw keyboard and mouse events; and
the first collaboration framework analyzing each captured event to determine whether the event is for the application.

31. The computer accessible medium of claim 27, wherein the program instructions are further configured to implement the first collaboration framework translating the input event to a non-platform-specific format prior to said sending a message.

32. A system, comprising:
a plurality of computer systems, each executing a respective collaboration framework and each executing a respective instance of an application, wherein said executing the instance of the application comprises displaying a respective instance of a graphical user interface of the application;
wherein a first collaboration framework of the collaboration frameworks on a first of the plurality of computer systems is configured to:
intercept, via an operating system event handling mechanism executing on the first computer system, a local user input event targeted to the instance of the application on the first computer system, wherein the instance of the application on the first computer system is configured to apply a modification to the respective instance of the graphical user interface in response to receiving the user input event;

in response to said intercepting, send a message, including the user input event, to each of the one or more other collaboration frameworks;

wherein in response to receiving the message from the first collaboration framework, each of one or more others of the plurality of collaboration frameworks is configured to deliver the user input event, via an operating system event handling mechanism executing on the respective computer system, to the respective other instance of the application executing on the respective other computer system and displaying a respective other instance of the user interface, as if the user input event originated locally from the respective other user interface displayed by on the respective other computer system; and wherein the delivered input event causes each of the respective other application instances to apply the modification to the respective instance of the graphical user interface.

* * * * *